United States Patent [19]

Pester et al.

[11] Patent Number: 4,932,067
[45] Date of Patent: Jun. 5, 1990

[54] LINEAR MOTION BEARING

[75] Inventors: Andrew L. Pester, Huntington; Peter R. Mugglestone, Northport; Robert C. Magee, Manhasset, all of N.Y.

[73] Assignee: Thomson Industries, Inc., Port Washington, N.Y.

[21] Appl. No.: 358,560

[22] Filed: May 30, 1989

[51] Int. Cl.$^5$ ............................................. F16C 29/06
[52] U.S. Cl. ........................................ 384/45; 464/168
[58] Field of Search ........................... 384/45, 43, 44; 464/168

[56] References Cited

U.S. PATENT DOCUMENTS

| | | | |
|---|---|---|---|
| 4,311,348 | 1/1982 | Olschewski et al. | 384/43 |
| 4,376,557 | 3/1983 | Teramachi. | |
| 4,406,502 | 9/1983 | Teramachi. | |
| 4,420,193 | 12/1983 | Teramachi. | |
| 4,420,194 | 12/1983 | Asami. | |
| 4,444,443 | 4/1984 | Teramachi | 384/43 |
| 4,502,737 | 3/1985 | Osawa. | |
| 4,582,369 | 4/1986 | Itoh. | |
| 4,595,244 | 6/1986 | Teramachi. | |
| 4,743,124 | 5/1988 | Blaurock. | |

Primary Examiner—Lenard A. Footland
Attorney, Agent, or Firm—Morgan & Finnegan

[57] ABSTRACT

A linear motion bearing is provided having a rail, a bearing carriage movable along the rail, a number of recirculating rolling element tracks formed in the carriage for conducting recirculating rolling elements between load bearing tracks and return tracks, the rolling elements serving to support the carriage on the rail when they are in the load bearing track, a number of integral retainer and inner guides structures substantially supported on the bearing carriage and end caps including turnaround tracks connecting the load bearing tracks and the return tracks, the end caps receiving the integral inner guides of the retainer and inner guides structure.

10 Claims, 4 Drawing Sheets

LINEAR MOTION BEARING

FIELD OF THE INVENTION

The present invention relates to anti-friction linear motion bearings and, more particularly, to rolling element retainers for use therein.

DESCRIPTION OF THE PRIOR ART

Linear motion bearings are well known in the art and are used extensively in a wide variety of machines, machine tools, and other equipment where one part is to be moved longitudinally with respect to another. These bearings may comprise an inverted U-shaped bearing carriage mounted astride a modified I-beam or T-beam shaped rail. One or two pairs of tracks and returns are provided in the carriage for a plurality of recirculating rolling elements, such as for example balls or rollers. These rolling elements travel alternately through load bearing tracks and return tracks to provide movement along the rail with minimum friction. End caps are located on either end of the carriage and usually are provided with turnarounds formed therein for transferring the recirculating rolling elements from load bearing tracks to return tracks. The turnarounds comprise a semi-toroidal shaped track connecting a load track to a return track. At the center of the semi-toroid, an inner guide is provided to smooth the movement of the rolling elements around the curved position from the load track to the return track and to prevent the rolling elements from bunching up in the turns. These end caps are usually formed out of plastic material using molds which form the curved tracks of the turnaround integral with the end cap. However, it is difficult to design a mold to provide an inner guide integral with the end caps. In fact the inner guides are usually molded in a separate operation and inserted into the proper position in the end cap during the assembly of the bearing. These separately molded inner guides are extremely small and easily misaligned or even overlooked during assembly. Further, where the linear motion bearings incorporate an integral lubrication system, the inner guides may be formed to be installed in only one orientation to provide adequate lubrication to the tracks. See, for example, U.S. Pat. No. 4,743,124 to Blaurock (FIG. 9, items 36, 37). These inner guides can be easily inverted during assembly resulting in premature operational failure due to inadequate lubrication.

When the recirculating rolling elements are in the load bearing track area of the bearing carriage, they are moveably held within the track by a rolling element retainer. This structure facilitates assembly and disassembly of the linear motion bearing by preventing the rolling elements in the load bearing track from falling out when the bearing carriage is removed from the rail. Rolling element retainers are generally of two types. In one type, half of the retainer is incorporated into each end cap and interlocks with the opposite retainer and end cap in the middle of the bearing carriage when the bearing is assembled. See, U.S. Pat. No. 4,743,124 to Blaurock; U.S. Pat. No. 4,420,193 and U.S. Pat. No. 4,376,557 to Teramachi et al. These types of bearings are inherently difficult to mold. Further, assembly is made more difficult by the need to use special equipment to load the recirculating rolling elements into the tracks.

The other type of retainer is formed as a separate structure and interlocks into the end caps for support. See, U.S. Pat. No. 4,502,737 to Osawa (FIG. 2, item 15) and U.S. Pat. No. 4,582,369 to Itoh (FIGS. 8-11, item 14 and FIG. 11, item 22). These bearings are easier to mold or fabricate than the first mentioned bearings however, they also present difficulties in assembly. More specifically, the retainer must be held in place until the recirculating rolling elements are inserted and both end caps are secure.

Accordingly, it is an object of the present invention to provide a linear motion bearing which overcomes the problems relating the manufacture and assembly of the inner guides and the rolling element retainer.

It is another object of the present invention to provide a linear motion bearing which is easier to assemble and has fewer parts.

It is a further object of the present invention to provide a linear motion bearing wherein the end caps, inner guides and rolling element retainers are easily molded using less complex molds than those required by the prior art. .

Further, it is an object of the present invention to provide a linear motionbearing that can be easily assembled by hand without the need for special equipment.

SUMMARY OF THE INVENTION

According to the present invention, there is provided a rolling element retainer substantially supported on a bearing carriage of a linear motion bearing. An inner guide is integrally formed on both ends of the retainer and fits into the balance of the turnaround track formed in the inner surfaces of each end cap.

The integral rolling element retainer and inner guides is easily molded as a single piece and eliminates the need to separately mold individual inner guides. The integral structure is generally formed from a flexible material and is removably attached to the bearing carriage by means of protrusions which fit into recesses in the bearing carriage. The rolling element retainer may also be provided with at least one projection along its longitudinal length on the side facing the inner surface of the bearing carriage. The projection(s) fit into corresponding slots formed in the bearing carriage and serve to provide further support for the integral rolling element retainer and inner guards structure.

Such a unique design for the retainer and inner guides allows for considerable ease of assembly of the linear motion bearing and reduces the number of small parts associated with the use of separate inner guides. For example assembly of a linear motion bearing in accordance with the present invention can be accomplished by simply snapping an integral retainer and inner guides structure on each inside surface of the bearing carriage, installing one end cap on the bearing carriage, turning the carriage, open end up, and dropping in the rolling elements, and placing the final end cap in place.

There is no need for special equipment to load the rolling elements and no small individual inner guides to insert. Furthermore, the molding of the integral retainer and inner guides structure as a single unit avoids the need to form and install the inner guides separately, a tedious and labor intensive process.

BRIEF DESCRIPTION OF THE DRAWINGS

The above and other objects, features and advantages of this invention will be apparent in the following detailed description of preferred embodiments, especially when taken in conjunction with the accompanying drawings, wherein.

DESCRIPTION OF PREFERRED EMBODIMENTS

Figure 1:
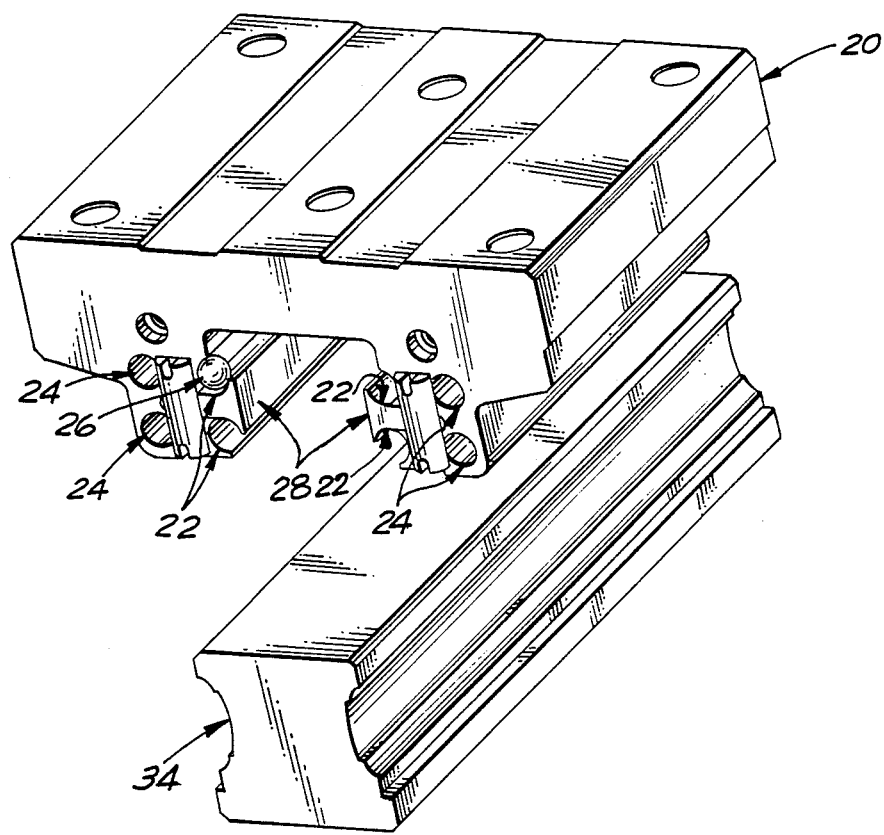
FIG. 1 is a perspective view of a bearing carriage with integral retainer and inner guides in accordance with one embodiment of the present invention using balls as the rolling element.
Figure 2:
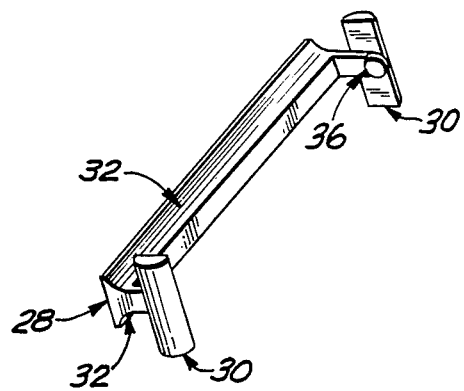
FIG. 2 is a perspective view of one embodiment of an integral retainer and inner guides.

Referring now to the drawings in detail, and initially to FIGS. 1 and 2, an inverted U-shaped bearing carriage 20 is shown having four load tracks and four return tracks 24 which combine to form two pairs of recirculating tracks for a plurality of rolling elements, in this case balls 26.

Two integral retainer and inner guides 28 are shown in place on the bearing carriage of FIG. The inner guides 30 are formed on the ends of the retainer structure 28 so as to be positioned between the openings of the load tracks 22 and return tracks 24 in the bearing carriage 20. These inner guides 30 serve to prevent the balls 26 from bunching up as they move between the load tracks 22 and the return tracks 24 when the linear motion bearing is in operation.

Figure 3:
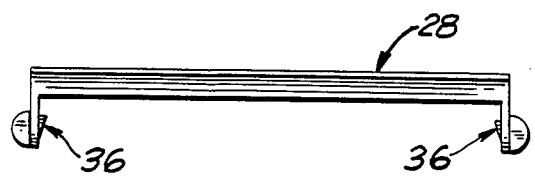
FIG. 3 is a side view of one embodiment of an integral retainer and inner guides.

The integral retainer and inner guides 28 in accordance with one embodiment of the present invention is shown in FIGS. 2 and 3. The structure has a T-shaped cross section and has a portion of the load tracks 32 formed in its lower surfaces. This configuration serves to retain the balls in the load tracks 22 of the bearing carriage 20 while providing access for the balls 26 to contact the rail 34.

The retainer and inner guides 28 is substantially supported on the bearing carriage 20 by means of protrusions 36 formed on the ends of the retainer structure. These protrusions 36 engage in recesses 38 formed in the ends of the bearing carriage 20. To facilitate ease of assembly, these protrusions 36 may be angled as shown in FIG. 3.

Figure 4:
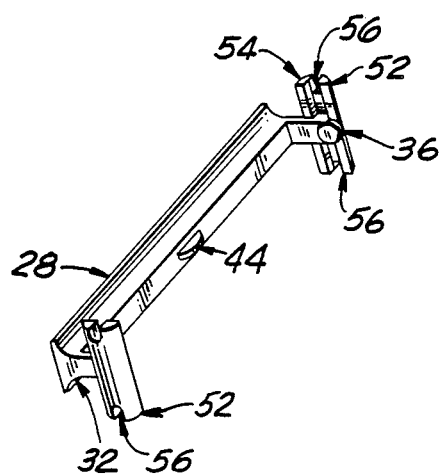
FIG. 4 is a perspective view of an integral retainer and inner guides adapted for longitudinal support and internal lubrication.
Figure 5:
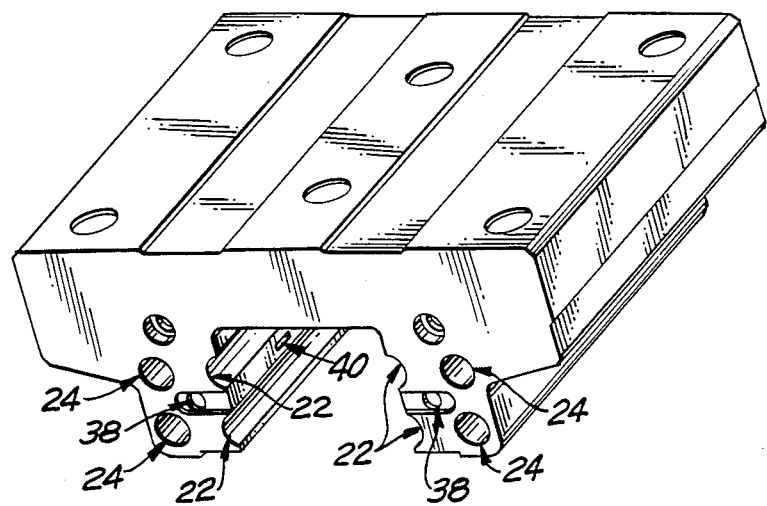
FIG. 5 is a perspective view of the bearing carriage without the integral retainer and inner guides installed.

Longitudinal support may be provided by forming projections 44 along the inside surface of the retainer and inner guides structure which abuts the bearing carriage 20. One embodiment of such structure is shown in FIG. 4. The projection 44 fits into a groove 40 formed in the inside surface of the bearing carriage 20 and serves to inhibit flexing of the integral retainer and inner guides 28.

The retainer and inner guides structure is preferably formed of a flexible material to facilitate ease of fabrication and assembly of the finished linear motion bearing. The structure in accordance with the present invention can be readily molded out of plastic material using conventional molding techniques. The invention however is not limited to such materials of construction and also can be practiced using relatively non-flexible materials such as stainless steel or aluminum.

Figure 6:
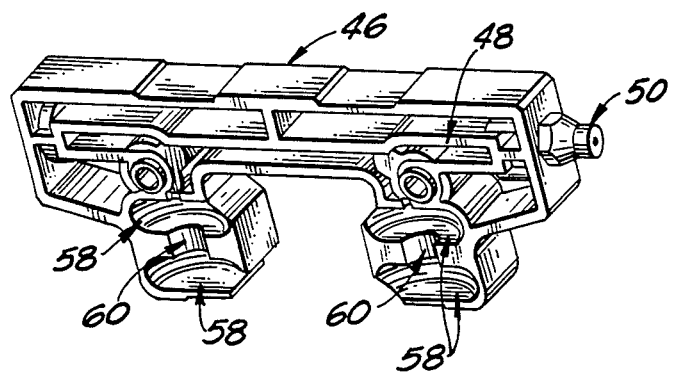
FIG. 6 is a perspective view of an end cap in accordance with one embodiment of the present invention having an integral lubrication system.

In accordance with another embodiment of the present invention, an integral lubrication system can be incorporated into the linear motion bearing to provide lubricant directly into the load tracks 22 and/or return tracks 24 without requiring disassembly of the entire bearing. A suitable lubrication system is shown generally in FIGS. 4 and 6. In that embodiment of a lubrication system, an end cap 46 is provided with a network of channels 48 for conducting lubricant from fitting 50 to inner guides 52. These inner guides 52 are also integrally formed with the retainer 28 and are further provided with a lubrication channel 54 and lubrication openings 56, which openings provide access directly into the semi-toroidal turnaround tracks 58 formed in the end cap 46. Thus, lubricant can be introduced from outside the linear motion bearing directly into the turnaround tracks 58 where it is picked up by the recirculating balls 26 as they travel through the turnaround tracks 58.

As mentioned above, the inner guides 30, 52 are integrally formed on the retainer and inner guides structure 28 so as to be positioned-between the load tracks 22 and the return tracks 24 on either side of the bearing carriage 20. These inner guides 30, 52 project out from the bearing carriage 20 and interfit into indentations 60 formed in the end cap 46 and are aligned with the axes of the turnaround tracks 58 when the end caps are installed on the bearing carriage 20. Thus, when the end cap 46 and the integral retainer and inner guides structure 28 are assembled on the bearing carriage 20 a plurality of complete recirculating tracks are formed in the bearing.

Assembly of the overall linear motion bearing is greatly simplified using the present invention. As discussed above, prior art systems required positioning a number of small pieces, and, in some configurations, special equipment to load the recirculating rolling elements into the tracks in the bearing carriage. Using the teachings and structure of the present invention, assembly of the completed linear motion bearing requires minimal steps, parts and no special equipment.

Figure 7:
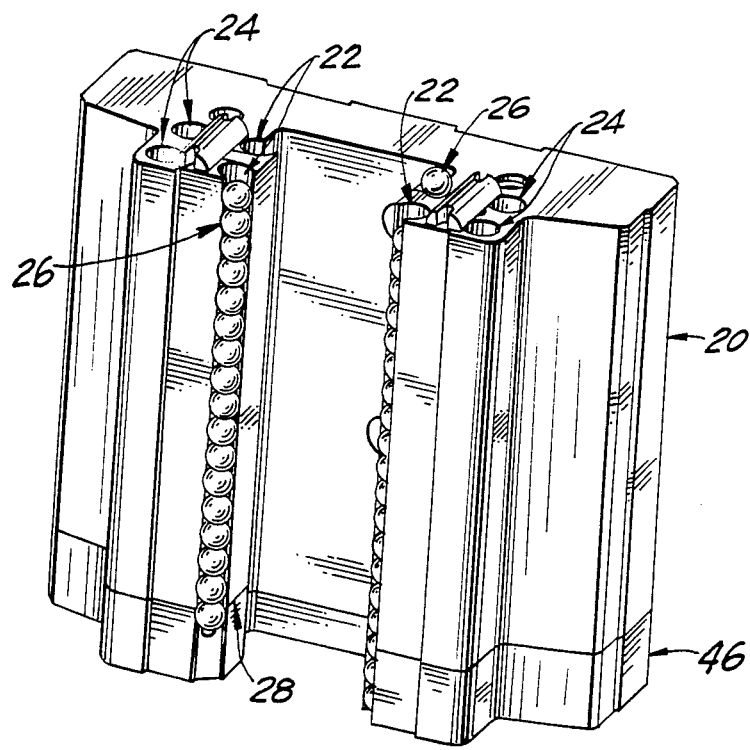
FIG. 7 is a perspective view of a partially assembled linear motion bearing in accordance with one embodiment of the present invention.
Figure 8:
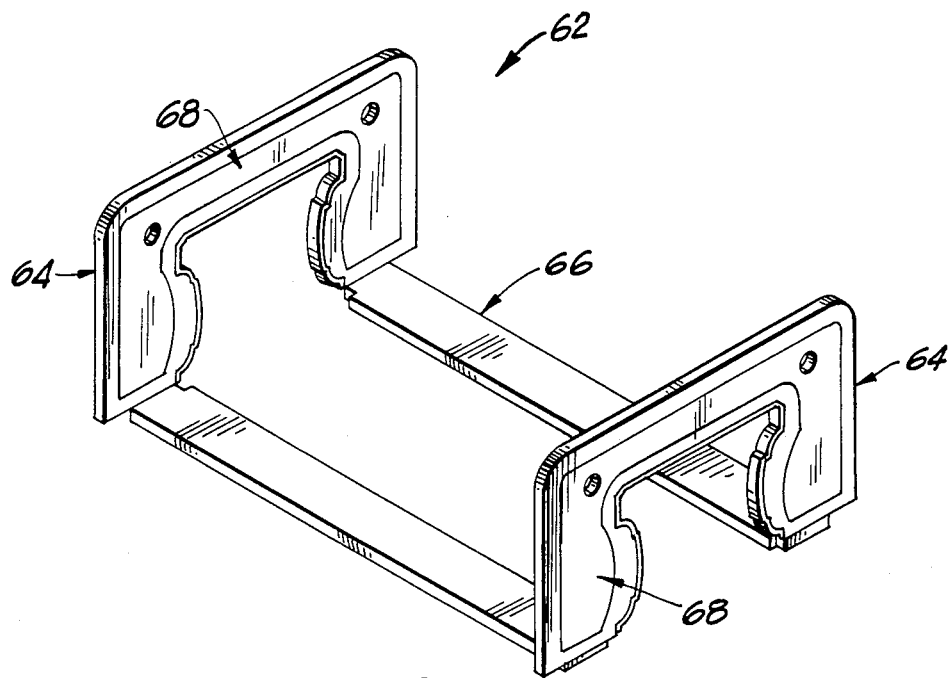
FIG. 8 is a perspective view of one embodiment of a seal in accordance with the present invention.

Assembly is accomplished by fitting a pair of integral retainer and inner guides 28 onto the bearing carriage 20 and then installing a single end cap 46 as shown in FIG. 7. The partially assembled bearing carriage 20 is then turned upright with the open face pointing upwards. A plurality of recirculating balls 26 are then easily inserted into the load tracks 22 and the return tracks 24. Assembly is completed by installing the remaining end cap onto the bearing carriage 20. The few balls 26 necessary to fill the total recirculating tracks can be maintained in the remaining end cap by applying a small quantity of lubricant or grease to hold them in place until the end cap 46 is securely installed.

Where the linear motion bearing is subjected to an environment which could possibly contaminate the rolling element tracks, a sealing means 62 can be added to the linear motion bearing to further protect access to the recirculating tracks. One embodiment of such a sealing means 62 is shown in FIG. 8 and comprises two end portions 64 interconnected by flexible, self adjusting longitudinal sections 66. The end portions 64 bolt securely to the end caps 46 of the linear motion bearing and stretch longitudinal sections 66 to adjustably fit along the bottom of the bearing carriage 20. These longitudinal sections serve to further protect the exposed load tracks 22 from external contamination during operation of the linear motion bearing.

The sealing means 62 can be fabricated from a wide variety of materials including plastics and metals. In the embodiment shown in FIG. 8, the seal incorporates metal stiffers 68 in the end portion 64 in order to give the seal further rigidity and sealing protection.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

We claim:

1. A linear motion bearing comprising: a rail; a bearing carriage movable along said rail; a plurality of recirculating rolling element tracks formed in said carriage for conducting a plurality of rolling elements between a load bearing track and a return track, said rolling elements supporting said carriage on said rail when in said load bearing track; a plurality of integral retainer and inner guides structure substantially supported by said bearing carriage; and a plurality of end caps including turnaround tracks connecting said load bearing tracks and said return tracks, said end caps receiving the integral inner guides of the retainer and inner guides structure.

2. A linear motion bearing in accordance with claim 1 wherein said integral ball retainer and inner guides structure is attached to said bearing carriage by protrusions formed in opposite ends of said structure, which protrusions fit into recesses formed in said bearing carriage.

3. A linear motion bearing in accordance with claim 1 wherein said integral retainer and inner guides structure further includes at least one projection along the length of the retainer portion of the structure, which projection fits into a groove in said bearing carriage.

4. A linear motion bearing in accordance with claim 1 wherein said integral retainer and inner guides structure is formed from a flexible plastic material.

5. A linear motion bearing in accordance with claim 1 wherein said integral retainer and inner guides structure is removably attached to said bearing carriage.

6. A linear motion bearing comprising: a rail; an inverted U-shaped bearing carriage movable along said rail; a plurality of recirculating ball tracks formed in said carriage for conducting a plurality of balls between a load bearing track and a return track, said balls supporting said carriage on said rail when in said load bearing track; a plurality of integral retainer and inner guides structures substantially supported on opposed inner walls of said bearing carriage; and a plurality of end caps including turnaround tracks connecting said load bearing tracks and said return tracks, said end caps containing slots for receiving the integral inner guides of the retainer and inner guides structure.

7. A linear motion bearing according to claim 6 further comprising an integral lubrication system.

8. A linear motion bearing according to claim 7 wherein said integral lubrication system is formed in at least one of said end caps.

9. A linear motion bearing according to claim 6 further comprising sealing means for protecting the balls and recirculating ball tracks from external debris.

10. A linear motion bearing according to claim 9 wherein said sealing means comprises a flexible self-adjusting seal.

* * * * *